Figure 1:
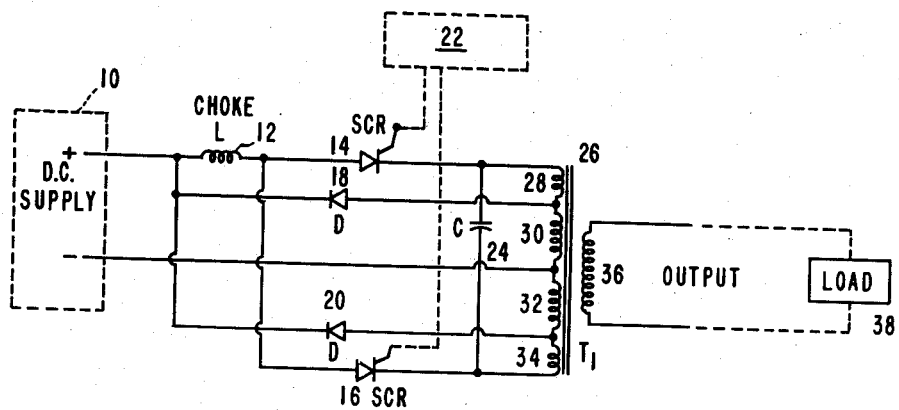

March 19, 1963 J. P. LANDIS 3,082,369
INVERTER APPARATUS
Filed July 27, 1961

INVENTOR
JAMES PHILIP LANDIS
BY Harry E. Braddock
ATTORNEY

United States Patent Office 3,082,369
Patented Mar. 19, 1963

3,082,369
INVERTER APPARATUS
James Philip Landis, Wilmington, Del., assignor to E. I. du Pont de Nemours and Company, Wilmington, Del., a corporation of Delaware
Filed July 27, 1961, Ser. No. 127,250
2 Claims. (Cl. 321—45)

This invention generally relates to parallel inverter circuits for converting D.C. power to A.C. power, and, more particularly, to a novel improved low-cost parallel inverter circuit.

The basic design theory of parallel inverters has been disclosed in some detail for thyratrons in textbooks and other publications. The same theory can be applied to circuits using silicon controlled rectifiers rather than thyratrons. The theoretical treatment is given, for example, in considerable detail by C. F. Wagner in articles, "Parallel Inverter With Resistance Load," Electrical Engineering, November 1935, pages 1227–1235; and "Parallel Inverter With Inductive Load," Electrical Engineering, September 1936, pages 970–980. Additional information on square-wave inverter circuits is given in the Controlled Rectifier Manual published by the General Electric Company, dated 1960.

It is an object of the present invention to provide a novel improved circuit for a square-wave parallel inverter which achieves a high level of reliability together with a reduction of the initial and maintenance costs by utilizing in place of the usual large, precisely-constructed and thus expensive transformer; one large inexpensive transformer and one small precise expensive commutating winding.

This object and others which will appear in the following specification and claims, are accomplished by a parallel inverter circuit arrangement comprising a source of D.C. power, a choke coil connected in series to the positive terminal of the D.C. source; two controlled rectifiers, their anodes connected to the choke coil, their control electrodes, or gates, connected to a trigger circuit; a commutating inductive winding with taps, the two outboard connections of the commutating winding connected to the two cathodes of the controlled rectifiers, the center tap of the commutating winding connected to the negative terminal of the D.C. source; two diodes, the cathodes of the diodes connected to the positive terminal of the D.C. source, the anodes of the diodes connected to two taps of the commutating winding; a commutating capacitor connected across the cathodes of the two rectifiers; an output transformer with the center tap connected to the negative terminal of the D.C. source, the two primary windings of the power transformer connected to the cathodes of the two rectifiers and in parallel with the commutating winding and the secondary of the power transformer connected to the load.

Figure 2:
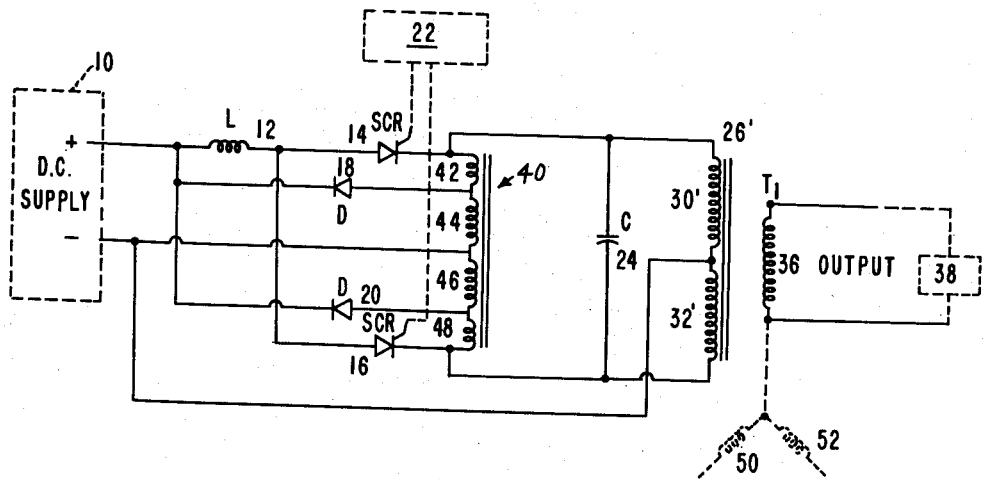

Other objects and advantages will appear in the following specification, claims, and accompanying drawings in which:

FIGURE 1 is a circuit diagram of a prior art parallel inverter for generating square waves, FIGURE 2 is a circuit diagram of an improved inverter arrangement embodying features of this invention.

Referring to FIGURE 1 of the drawings, the components of the system, connected as shown, consist of a D.C. source 10, a choke coil 12, controlled rectifiers 14 and 16, preferably silicon controlled rectifiers (identified hereafter as SCR's), diodes 18 and 20, a suitable trigger circuit 22 of conventional design, a commutating capacitor 24, a load transformer 26 with primary coils 28, 30, 32, 34, and secondary coils 36 with a load indicated as 38.

Referring now to FIGURE 2, many of the components are identical to those shown in FIGURE 1 and are so identified. Transformer 26' is similar in characteristics to transformer 26 except for the diode taps. Coil 30' has the same number of turns as the sum of the number of turns in coils 28 and 30 while coil 32' has the same number of turns as the sum of coils 32 and 34. The improvement consists of the provision of commutating winding 40 with coils 42, 44, 46, 48, similar in electrical characteristics to coils 28, 30, 32, 34, of transformer 26. In operation, the coils 28, minimize voltage oscillations following commutation. To accomplish this in a single large transformer of sufficient size to carry the output load satisfactorily is somewhat costly. However, this problem of high fabrication and maintenance costs has been considerably relieved by the use of the arrangement of FIGURE 2 in which transformer 26' serves only as an output transformer and is not required to be closely coupled, and by the use of winding 40, which provides low leakage reactance to minimize voltage oscillations following commutation and the resultant higher forward voltage imposed on the blocking SCR. Use of the closely coupled small winding for commutation permits a standard and relatively high leakage reactance transformer to be used to handle the heavy load current. In practice, the commutating winding taps for the diodes are typically 10–25% from the end of the windings at each end.

In the circuit of FIGURE 2, the trigger circuit 22 applies positive trigger pulses alternately to the gates of SCR 14 and SCR 16. Assuming that SCR 14 is conducting and SCR 16 is blocking, the current from supply 10, with a potential of E, will then flow through the choke coil 12, SCR 14, and coils 42 and 44 of winding 40, and coil 30' of transformer 26'. The transformer action and capacitor 24 will produce a voltage of approximately 2E at the cathode of SCR 16 and across capacitor 24. When the next trigger pulse is applied to the gate of SCR 16, it will turn on and the voltage at the cathode of SCR 16 will fall to a value equal to the forward conducting drop. The voltage at the cathode of SCR 14 will rise to approximately plus 2E relative to anode because of the action of the commutating capacitor 24. The capacitor 24 will maintain a reverse bias across SCR 14 long enough for it to recover to the blocking state. The next trigger pulse will occur at the gate of SCR 14 and cause the circuit to revert to the original state. In this manner, the current from the supply 10 will flow alternately through the primary of the transformer 26' and produce an A.C. voltage at the load 38.

The choke or inductance 12 serves as a ballast to prevent excessive current flow during this switching. During the switching interval, opposing currents can flow in both primary coils 30' and 32' of the transformer 26' to the commutating capacitor 24 and to the cathode of the SCR which has been turned on. If this current is not limited, the charging time for the commutating capacitor 24 will be very short and the SCR which is to be turned off will not be reverse-biased long enough for it to recover. The feedback diodes 18 and 20 prevent the voltage across either coil 30' or 32' from exceeding the supply voltage by more than $$E\left(\frac{\text{turns in coil 42}}{\text{turns in coil 44}}\right)$$

These diodes not only maintain a substantially square wave output under all load conditions but also permit the use of lower breakover voltage (and less expensive) SCR's. The diodes also compensate for leading or lagging PF loads by feeding reactive power back into the supply. This permits the commutating capacitor to be much smaller since its value depends on the maximum current to be commutated and does not have to correct for the reactive load current.

The improved arrangement may be used in precisely controlling the speed of motors, either at a fixed speed or at a varying speed. By controlling the frequency of the signals from the trigger circuit, the motor speed can be precisely controlled. As indicated in FIGURE 2, three units or circuits can be connected in a Y configuration at the output transformer so as to give three-phase power to a motor. Another use is to convert D.C. power to A.C., then, by means of an ordinary transformer, to convert the A.C. to higher voltage A.C. which may then be rectified to D.C., obviously, at a much higher voltage than the original D.C. source. Typically, this could be used in battery operated radio receivers and transmitters (e.g., military). Additional uses of precisely-controlled square-wave power are obvious to those skilled in the art.

The principal advantage of this invention is that it reduces the initial costs, maintenance, and repair of the equipment. This is of great advantage where a number of these circuits are used to drive many motors such as in a bank of identical equipment where there may be, for example, twenty to one hundred similar pieces of equipment.

Although the improved arrangement has been described with reference to a certain embodiment thereof, it is desired to cover all modifications falling with the scope of the appended claims.

I claim:

1. An improved inverter circuit arrangement comprising a D.C. power source having positive and negative terminals, a choke coil connected in series with one of said terminls of said source, two electrical switching units, each unit having an anode, a cathode, and a control electrode, the anodes of said units connected in parallel with each other and in series with said choke coil, each of said control electrodes operatively connected to a trigger circuit, a commutating winding having taps at each end thereof, a center tap, and two additional taps, one intermediate each end tap and the center tap, each of the end taps of said commutating winding connected electrically with one of said cathodes of said units, the center tap of said winding electrically connected to the other terminal of said source, two diode units, each provided with an anode and a cathode, each of said cathodes of said diode units electrically connected in parallel with each other and in series with said one terminal of said source, each of said anodes of said diode units connected to a separate one of said additional taps of said commutating winding, a commutating capacitor element connected across the cathodes of said switching units, an output transformer comprising a primary winding provided with two end taps and a center tap, said center tap of said transformer winding electrically connected to said other terminal of said source, each of said end taps of said transformer winding electrically connected to one of said cathodes of said switching units to connect the said transformer winding in parallel with said commutating winding, said output transformer further comprising a secondary winding operatively connected to an electrical load.

2. The improved arrangement of claim 1 in which said switching units are silicon controlled rectifiers.

References Cited in the file of this patent

UNITED STATES PATENTS

| | | |
|---|---|---|
| 2,952,818 | Russell et al. | Sept. 13, 1960 |
| 3,010,062 | Van Emden | Nov. 21, 1961 |